Patented Jan. 13, 1948

2,434,507

UNITED STATES PATENT OFFICE 2,434,507

2-CHLORO-3-IMINOBUTYRONITRILE AND PROCESS

Jerome L. Mostek, Chicago, Ill., assignor to Sinclair Refining Company, New York, N. Y., a corporation of Maine No Drawing. Application October 10, 1945, Serial No. 621,607

3 Claims. (Cl. 260—464)

This invention relates to 2-chloro-3-iminobutyronitrile, and to readily prepared products of hydrolysis thereof, namely, 2-chloro-3-ketobutyronitrile and 2-chloro-3-ketobutyramide.

The invention includes a new process of preparing these compounds, which consists in the treatment of 2,2,3-trichlorobutyronitrile with liquid ammonia. The new process is applicable to the production of other 2-chloro-3-iminonitriles having in excess of four carbon atoms.

The 2-chloro-3-iminobutyronitrile is a crystalline product, melting at 116–117° C.; useful, among other purposes, for preparing the corresponding ketonitrile, ketoamide, and the 2-chloroketo esters. The 2-chloro-3-ketobutyronitrile is a liquid, boiling at 185–187° C. (103° C./50 mm.). The 2-chloro-3-ketobutyramide is a white crystalline product melting at 76–77° C.

The invention will be illustrated by the following example, but it is not limited thereto.

*Example.*—To liquid ammonia in a bomb reactor is gradually added 2,2,3-trichlorobutyronitrile, the molar ratio of ammonia to nitrile being about 15 to 1. The mixture is permitted to stand at room temperature, about 25° C., for 17 hours. Excess ammonia is then removed by reducing the pressure, and the residue remaining in the bomb extracted with absolute ethyl alcohol. Ammonium chloride remains as a residue. The filtrate is concentrated under vacuum. On the addition of water, crystals form and precipitate from the solution. 2-chloro-3-iminobutyronitrile is obtained in good yield. On recrystallization from water, a product with a melting point of 116–117° C. is obtained.

The crude reaction product is treated with a concentrated hydrochloric acid at 5° C. The solid product which first forms gradually becomes a heavy liquid, and the reaction mixture forms two layers. On extraction with ether, drying and fractionating, 2-chloro-3-ketobutyronitrile is obtained in good yield.

Careful hydrolysis of the 2-chloro-3-iminobutyronitrile with equimolar proportions of concentrated sulfuric acid and water gives 2-chloro-3-ketobutyramide, M. P. 76–77° C., in good yield.

Refluxing of the 2-chloro-3-ketobutyronitrile of the invention with concentrated sulfuric acid and an excess of absolute ethyl alcohol for a substantial period, for example, 11 hours, followed by removal of the alcohol by distillation, the addition of water, extraction with ether, drying and fractionating gives 2-chloroacetoacetic ethyl ester, a valuable intermediate, boiling point 193–197° C., in good yield.

By the treatment of other 2,2,3-trichloronitriles with liquid ammonia, such as 2,2,3-trichlorovaleronitrile and 2,2,3-trichlorocapronitrile, the corresponding higher imino nitriles are obtained.

I claim:

1. 2-chloro-3-iminobutyronitrile.

2. In a process for preparing 2-chloro-3-iminobutyronitrile the step which comprises reacting 2,2,3-trichlorobutyronitrile with liquid anhydrous ammonia.

3. In a process for producing 2-chloro-3-iminonitriles having at least four carbon atoms, the step which comprises reacting a compound of the formula

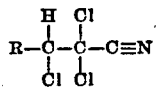

in which R is alkyl, with liquid anhydrous ammonia.

JEROME L. MOSTEK.

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,109,929 | Rigby | Mar. 1, 1938 |
| 2,163,594 | Engels et al. | June 27, 1939 |

OTHER REFERENCES

Keil, Chemical Abstracts, vol. 22, p. 385 (1928).

Quilico et al., Chemical Abstracts, vol. 32, col. 7455 (1938).

Bilton et al., Jour. Chem. Soc., vol. 1937, pp. 922–929.